(12) United States Patent
Lin

(10) Patent No.: US 8,279,426 B2
(45) Date of Patent: Oct. 2, 2012

(54) TESTING DEVICE FOR LENS MODULE

(75) Inventor: Mong-Tung Lin, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 672 days.

(21) Appl. No.: 12/494,278

(22) Filed: Jun. 30, 2009

(65) Prior Publication Data

US 2010/0039270 A1    Feb. 18, 2010

(30) Foreign Application Priority Data

Aug. 14, 2008  (CN) .......................... 2008 1 0303755

(51) Int. Cl.
*G01B 9/00* (2006.01)

(52) U.S. Cl. ...................................... 356/124

(58) Field of Classification Search ........... 356/124–127
See application file for complete search history.

(56) References Cited

U.S. PATENT DOCUMENTS 6,154,274 A * 11/2000 Davis et al. ................... 356/124

* cited by examiner

*Primary Examiner* — Tara S Pajoohi Gomez

(74) *Attorney, Agent, or Firm* — Altis Law Group, Inc.

(57) ABSTRACT

An testing device for lens module includes an image sensor, a light source assembly, a testing tray, a detecting device, and a processor. The light source assembly is aligned with the image sensor. The testing tray is disposed between the light source assembly and the image sensor, and defines a plurality of through holes for receiving lens modules. The detecting device is configured for detecting whether the lens module to be tested is tilted. The processor controls the moving of the image sensor and the testing tray. The processor is capable of stopping the moving of the image sensor and the testing tray when the detecting device detected the lens module to be tested is tilted.

11 Claims, 3 Drawing Sheets

TESTING DEVICE FOR LENS MODULE

BACKGROUND

1. Technical Field

The present disclosure relates to testing devices and, particularly, to a testing device for lens modules.

2. Description of Related Art

As is well known, testing processes play a significant role in ensuring imaging quality of lens modules. A typical testing device includes a light source assembly for providing a predetermined testing specimen, a testing tray for supporting lens modules, and an image sensor for capturing image of the testing specimen formed by each lens module. The image sensor and/or the testing tray need to move relative to each other during the testing process. If the lens module is very small, for example, a lens module for a mobile phone, the gap between the image sensor and the lens module supported by the testing tray is very small, usually smaller than 2 mm. Therefore should the lens module to be tested tilts, the image sensor and the lens module may collide causing damage to one or the other.

What is needed, therefore, is a testing device for lens modules capable of detecting whether the lens module to be tested is tilted to overcome or at least mitigate the above-described problem.

BRIEF DESCRIPTION OF THE DRAWINGS

Many aspects of the present testing device for lens module can be better understood with reference to the accompanying drawings. The components in the drawings are not necessarily drawn to scale, the emphasis instead being placed upon clearly illustrating the principles of the present testing device for lens module. In the drawings, all the views are schematic.

DETAILED DESCRIPTION

Embodiments of the present disclosure will now be described in detail below, with reference to the accompanying drawings.

Figure 1:
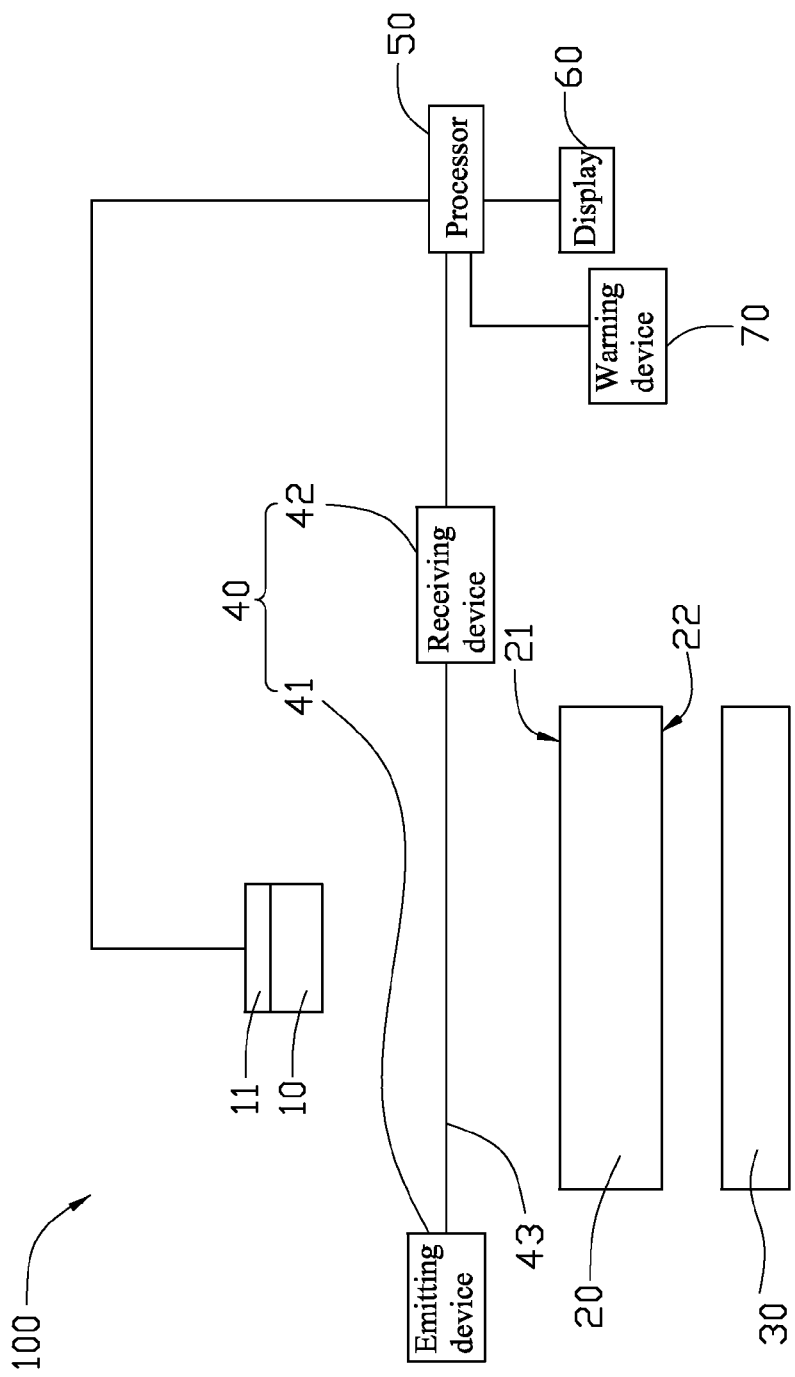
FIG. 1 is a schematic view of a testing device for lens module according to an exemplary embodiment.

Referring to the FIG. 1, a testing device 100 used for testing lens modules 200 (see FIG. 3), according to an exemplary embodiment, is shown. The testing device 100 includes an image sensor 10, a testing tray 20, a light source assembly 30, a detecting device 40, a processor 50, a display 60, and a warning device 70.

The image sensor 10 could be a charge coupled device (CCD) or a complementary metal-oxide semiconductor transistor (CMOS). The image sensor 10 is distanced from the testing tray 20 and is firmly secured to a robotic arm 11. The robotic arm 11 is configured for driving the image sensor 10 to move up and down along a direction perpendicular to the testing tray 20. Accordingly, a distance between the image sensor 10 and the testing tray 20 can be adjusted by the robotic arm 11, thereby adjusting imaging definition of the lens modules 200 disposed on the testing tray 20.

Figure 2:
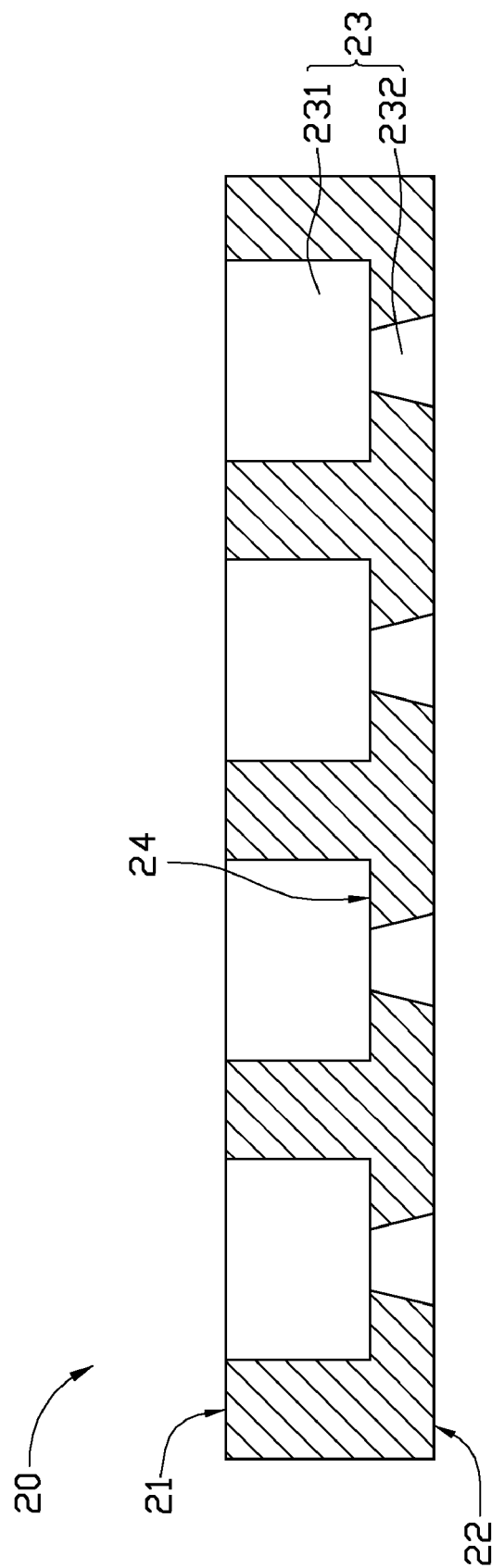
FIG. 2 is a cross-sectional view of a testing tray of the testing device of FIG. 1.

The testing tray 20 is disposed between the light source assembly 30 and the image sensor 10. The testing tray 20 includes a first surface 21 and a second surface 22 at two opposite sides thereof. The first surface 21 faces the image sensor 10, and the second surface 22 faces the light source assembly 30. Further referring to FIG. 2, the testing tray 20 defines a plurality of through holes 23 running through the first surface 21 and the second surface 22. Each through hole 23 has a receiving cavity 231 and a light transmission aperture 232 coaxially adjoining the receiving cavity 231. The receiving cavity 231 is adjacent to the first surface 21 and configured for accommodating a lens module 200 to be tested therein. The depth of the receiving cavity 231 is less than the height of the lens module 200. The light transmission aperture 232 is adjacent to the second surface 22 and has a diameter slightly smaller than the receiving cavity 231. Accordingly, a step portion 24 is formed at adjoining position of the receiving cavity 231 and the light transmission aperture 232, for supporting the lens module 200 thereon. The light transmission aperture 232 has a larger diameter than optical components (not shown) in the lens modules 200 to facilitate the transmission of light from the light source assembly 30 to the optical components. In other embodiments, the light transmission aperture 232 can also be a trumpet-shaped void, and diameters in cross-section of the light transmission aperture 232 increase from the step portion 24 to the second surface 22. The testing tray 20 can be moved in a plane parallel to the image sensor 10.

In the present embodiment, the light source assembly 30 is stationary and optically aligned with the image sensor 10. The light source assembly 30 is configured for providing a predetermined testing pattern/specimen. It is understood, in other embodiments, the testing tray 20 can be stationary, and both of the image sensor 10 and the light source assembly 30 are movable along a direction parallel to the testing tray 20.

Figure 3:
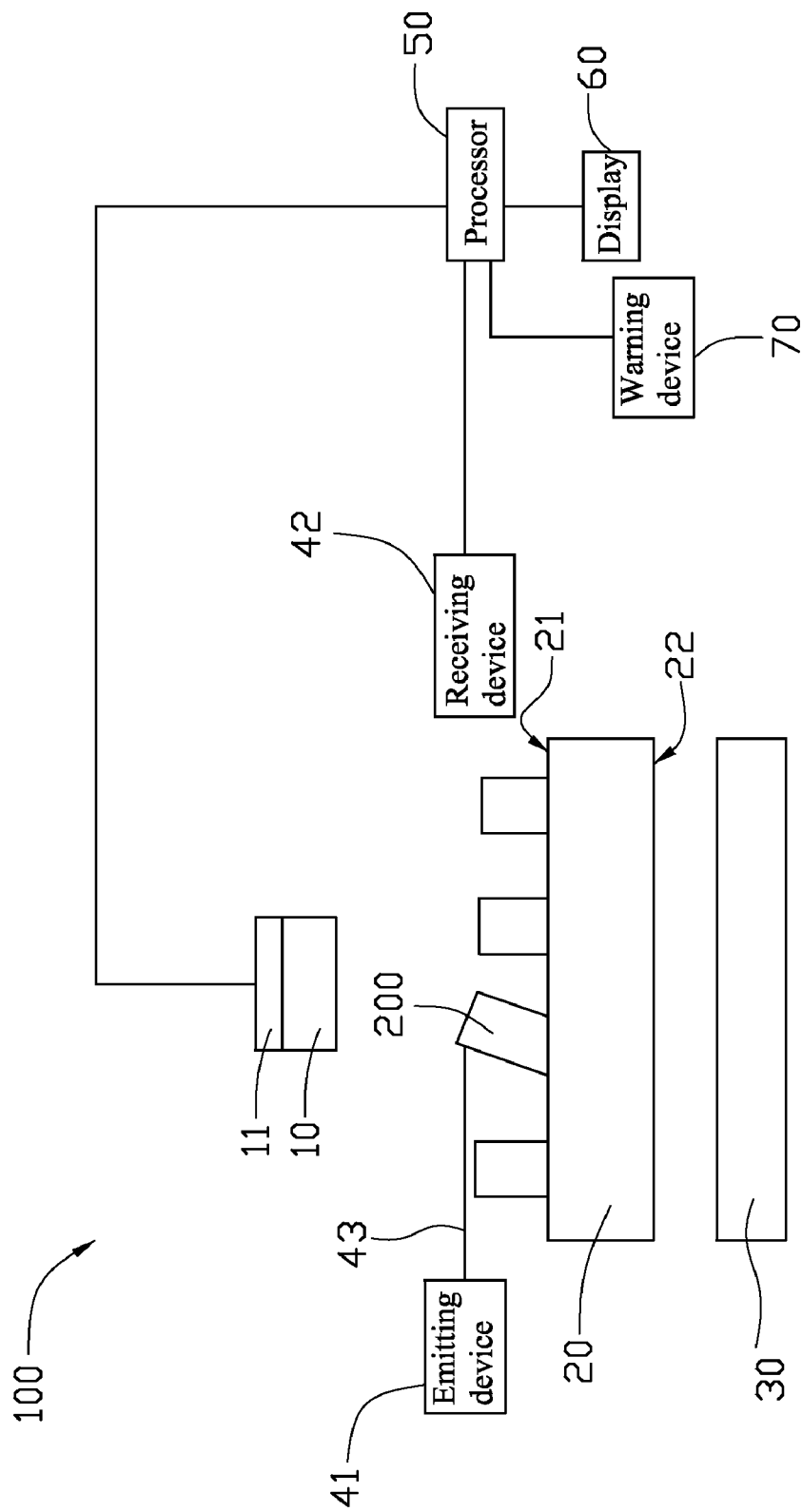
FIG. 3 is a schematic view of the testing device of FIG. 1 during a working state.

The detecting device 40 is configured for detecting whether the lens module 200 to be tested has tilted relative to the testing tray 20. In the present embodiment, the detecting device 40 includes an emitting device 41 and a receiving device 42. The emitting device 41 emits a ray 43, such as laser, infrared ray, etc., along a direction substantially parallel to the first surface 21 of the testing tray 20. The receiving device 42 is aligned with the emitting device 41 for receiving the ray 43 emitted from the emitting device 41. Referring to FIG. 3, the distance between ray 43 and the first surface 21 is slightly greater than the height of a portion of the lens module 200 extending out of the receiving cavity 231 of the through hole 23, when the lens module 200 is not tilted. If the lens module 200 is tilted, the height of the portion of the lens module 200 extending out of the receiving cavity 231 of the through hole 23 will be greater, and the ray 43 will be blocked by the lens module 200, and the receiving device 42 cannot receive the ray 43. The detecting device 40 is not limited to the above-described structure, any devices capable of detecting whether the lens module 200 to be tested has tilted can be the detecting device 40. For example, the detecting device 40 can also be an image capturing device with image recognition software, the image capturing device can capture an image of the lens module 200 to be tested on the testing tray 20, and then use the image recognition software to check whether the lens module 200 has tilted.

The processor 50 is electrically connected to the image sensor 10, the receiving device 42, the display 60, and the warning device 70. The warning device 70 is configured for generating an alarm signal to operators. The warning device 70 can be a loudspeaker, a lamp, and so on. The processor 50 can save and analyze the image captured by the image sensor 10, and control the movement of the robotic arm 11. When the receiving device 42 fails to receive the ray 43, the processor 50 will stop the moving of the robotic arm 11 and the moving of the testing tray 20, and controls the warning device 70 to activate an alarm signal for operators. The display 60 can be used for displaying the image captured by the image sensor 10.

In the present embodiment, when the lens module 200 to be tested has tilted on the testing tray 20, it will block the ray 43 emitted from the emitting device 41, and the receiving device 42 will fail to receive the ray 43. The processor 50 will stop the moving of the robotic arm 11 and the moving of the testing tray 20. Therefore, the image sensor 10 may be righted before having tilted enough to collide with the lens module 200, thus avoiding damage to the image sensor 10 and/or the lens module 200. Furthermore, because the processor 50 can also control the warning device 70 to activate an alarm signal, operators can right the tilted lens module 200 as soon as possible.

While certain embodiments have been described and exemplified above, various other embodiments will be apparent to those skilled in the art from the foregoing disclosure. The invention is not limited to the particular embodiments described and exemplified, and the embodiments are capable of considerable variation and modification without departure from the scope and spirit of the appended claims.

What is claimed is:

1. A testing device for testing a lens module, comprising:
    an image sensor secured to a robotic arm;
    a light source assembly optically aligned with the image sensor;
    a testing tray disposed between the light source assembly and the image sensor, the testing tray defining a plurality of through holes for receiving lens modules;
    a detecting device for detecting whether the lens module to be tested is tilted relative to the testing tray;
    the detecting device comprises an emitting device and a receiving device wherein the emitting device emits a ray along a direction substantially parallel to the testing tray, the receiving device is aligned with the emitting device for receiving the ray emitted from the emitting device when the receiving device fails to receive the ray emitted by the emitting device,
    a processor to control the robotic arm, wherein the robotic arm is configured for driving the image sensor to move up and down along a direction perpendicular to the testing tray; and
    wherein the processor controls the robotic arm to stop moving.

2. The testing device for lens module of claim 1, wherein the testing tray comprising a first surface facing the image sensor and a second surface facing the light source assembly, the through hole comprises a receiving cavity adjacent to the first surface and a light transmission aperture adjacent to the second surface, a step portion is formed at adjoining position of the receiving cavity and the light transmission aperture for supporting the lens module.

3. The testing device for lens module of claim 2, wherein the light transmission aperture is coaxially with the receiving cavity.

4. The testing device for lens module of claim 3, wherein the diameter of the light transmission aperture is smaller than that of the receiving cavity.

5. The testing device for lens module of claim 2, wherein the light transmission aperture has a larger diameter than optical components in the lens module.

6. The testing device for lens module of claim 2, wherein the depth of the receiving cavity is less than the height of the lens module.

7. The testing device for lens module of claim 2, wherein the light transmission aperture is a trumpet-shaped void, and diameters in cross-section of the light transmission aperture increase from the step portion to the second surface.

8. The testing device for lens module of claim 1, wherein the ray emitted by the emitting device is laser or infrared ray.

9. The testing device for lens module of claim 1, further comprising a warning device for generating an alarm signal to operators when the receiving device of the detecting device fails to receive the ray emitted by the emitting device.

10. The testing device for lens module of claim 9, wherein the warning device is a loudspeaker or a lamp.

11. The testing device for lens module of claim 1, further comprising a display for display an image captured by the image sensor.

* * * * *